United States Patent
Thapa et al.

(10) Patent No.: US 10,338,315 B2
(45) Date of Patent: Jul. 2, 2019

(54) SPLICING OF CRYSTAL FIBER TO SILICA FIBER WITH REACTION BONDING

(71) Applicant: The United States of America, as represented by the Secretary of the Navy, Washington, DC (US)

(72) Inventors: Rajesh Thapa, Manassas, VA (US); Rafael R. Gattass, Washington, DC (US); Daniel J. Gibson, Falls Church, VA (US); Woohong Kim, Washington, DC (US); L. Brandon Shaw, Woodbridge, VA (US); Jasbinder S. Sanghera, Ashburn, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/784,698

(22) Filed: Oct. 16, 2017

(65) Prior Publication Data
US 2018/0106968 A1    Apr. 19, 2018

Related U.S. Application Data

(60) Provisional application No. 62/408,938, filed on Oct. 17, 2016.

(51) Int. Cl.
*G02B 6/255* (2006.01)
*G02B 1/02* (2006.01)

(52) U.S. Cl.
CPC ............ *G02B 6/2551* (2013.01); *G02B 1/02* (2013.01); *G02B 6/2553* (2013.01)

(58) Field of Classification Search
USPC .................................... 385/96, 147
See application file for complete search history.

(56) References Cited

U.S. PATENT DOCUMENTS

| 6,705,771 B2 | 3/2004 | Jiang et al. | |
|---|---|---|---|
| 6,921,216 B1 | 7/2005 | Li et al. | |
| 2002/0114594 A1* | 8/2002 | Kato | G02B 6/2551 385/96 |
| 2003/0059179 A1* | 3/2003 | Jiang | G02B 6/2551 385/96 |
| 2003/0081930 A1* | 5/2003 | Filhaber | C03C 27/06 385/147 |

(Continued)

OTHER PUBLICATIONS

Barnes et al., "Sapphire Fibers: Optical Attenuation and Splicing Techniques," Appl. Opt. 34, 6855-6858 (Oct. 20, 1995).

(Continued)

*Primary Examiner* — Eric Wong
(74) *Attorney, Agent, or Firm* — US Naval Research Laboratory; William P. Ladd

(57) ABSTRACT

Systems and methods are disclosed for splicing crystal fibers to silica glass fibers. Embodiments of the present disclosure provide mechanically stable bonds with negligible optical transmission loss by splicing fibers through a thermally enhanced reaction bonding process at lower temperatures than the melting point of the crystal. In an embodiment, mixing of the materials at elevated temperatures forms a stable intermediary material which enhances strength and reduces the transmission losses.

20 Claims, 9 Drawing Sheets

(56) References Cited

U.S. PATENT DOCUMENTS

2009/0060429 A1* 3/2009 Dimmick .............. G02B 6/032
 385/96
2017/0307825 A1* 10/2017 Bickham ............ G02B 6/02014

OTHER PUBLICATIONS

Kolitsch et al., "Phase relationships in the systems $Re_2O_3$—$Al_2O_3$—$SiO_2$ (RE=rare earth element, Y, and Sc)," J. Phase Equilibria 19, 426 (Nov. 5, 1998).

Lai et al., "Yb 3+: YAG Silica Fiber Laser," Opt. Lett. 34, 2357-2359 (Aug. 1, 2009).

Ballato et al., "On the Fabrication of All-Glass Optical Fibers From Crystals," J. Appl. Phys. 105, 53110 (Mar. 13, 2009).

Lai et al., "Study on the Core/Cladding Interface in Cr:YAG Double-Clad Crystal Fibers Grown by the Codrawing Laser-Heated Pedestal Growth Method," J. Appl. Phys. 108, 54308 (Sep. 2, 2010).

* cited by examiner

SPLICING OF CRYSTAL FIBER TO SILICA FIBER WITH REACTION BONDING

CROSS REFERENCE TO RELATED APPLICATIONS

This application claims the benefit of U.S. Provisional Patent Application No. 62/408,938, filed on Oct. 17, 2016, which is incorporated by reference herein in its entirety.

FIELD OF THE DISCLOSURE

This disclosure relates to optical systems, including fibers for optical systems.

BACKGROUND

Optical fiber-based devices are exposed to a variety of environmental conditions, including temperature fluctuations, mechanical vibrations, and shock. Thus, robust methods for ensuring the transmission of the optical field between two optical fibers that can withstand these environmental conditions are crucial for the development of fiber-based systems. Further, because optical fibers can be made using a variety of materials, there is a need to couple light between optical fibers having distinct material properties. Mechanical and fusion splicing are the most used methods for connecting optical signals between dissimilar material optical fibers. Mechanical splicing involves mechanically locking the position of the optical fibers in place with variants, including the use of liquids or soft deformable materials to fill the gap between the fibers. Fusion splicing between fibers involves delivering heat to soften the fibers and induce chemical and mechanical bonding both fiber end faces together.

Conventional mechanical and fusion splicing methods suffer from several disadvantages. Fusion splicing methods suffer from limited applicability, as the degree in dissimilarity between materials has to be small to ensure chemical bonding. Mechanical splicing approaches can be flexible with respect to the fiber material, but they display larger insertion losses, lower power handling, and higher sensitivity to thermal variations and mechanical perturbations than those of joints made using fusion splicing. For highly dissimilar materials, the difference in refractive indexes can limit the practical implementation of fluid or soft based intermediaries for mechanical splices, with many higher index fluids being toxic or not being a suitable material to bridge the refractive index difference without significant losses.

Conventional splicing methods cannot be used to splice dissimilar materials and/or result in unsatisfactory insertion loss. For continuous operation of high power laser, losses at the splice of more than I dB are not a viable for commercial applications. The optical power lost at the splice is converted to heat and requires lots of thermal management for sustained operation. Even a small mismatch of the mode field diameter and numerical aperture between the dissimilar fibers can lead to a temperature rise across the spliced interface. Another disadvantage of conventional splicing methods is the catastrophic failure of the splice due to stress at the interface and large thermo-mechanical differences in the dissimilar materials.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
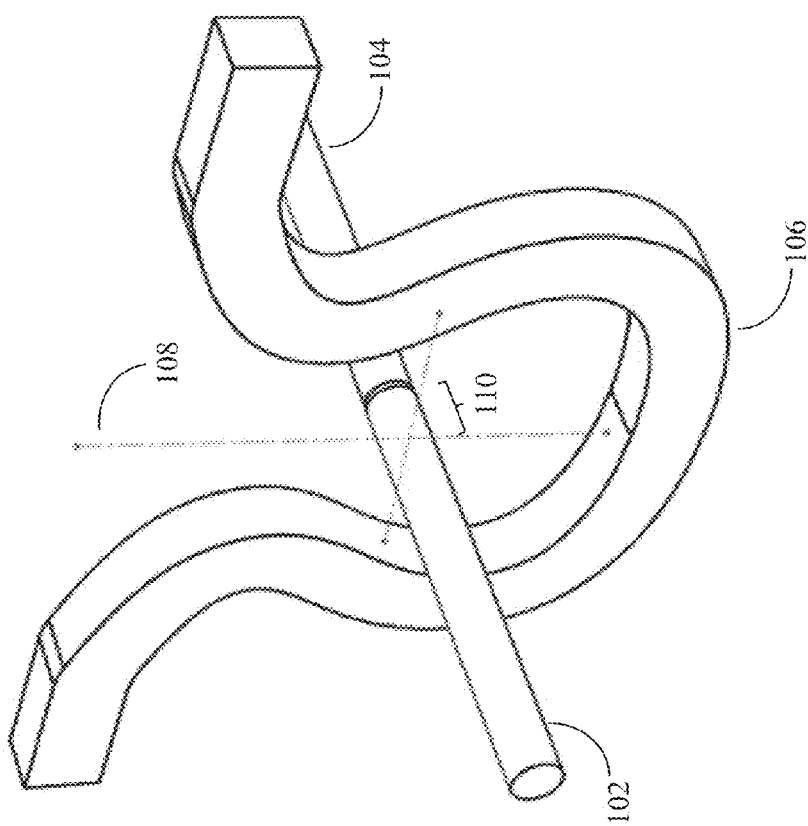
FIG. 1 is a diagram of an exemplary system for splicing a first fiber to a second fiber using reaction bonding in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include one of software, or firmware, or hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. Overview

Embodiments of the present disclosure provide systems and methods for splicing crystal fibers to silica-glass fibers. Disparate material properties between crystal and silica fibers can present challenges to forming mechanically and thermally stable bonds. Embodiments of the present disclosure provide mechanically stable bonds with negligible optical transmission loss by splicing the fibers through a thermally enhanced reaction bonding process at a lower temperature than the melting point of the crystal. The mixing of the materials at elevated temperatures forms a stable intermediary material, which enhances the strength of the fiber splice and reduces transmission losses. This method has direct benefits for the development of high power integrated laser systems based on single crystal fibers in a compact form factor.

In conventional splicing techniques, the two fibers are cleaved (or polished) to ensure a well-defined plane surface and are then heated above the softening temperature of the glass material. Conventional splicing techniques do not provide, for example, a system or method for crystal to glass splicing, as described by embodiments of the present disclosure. Alternative approaches require the pre-treatment of the fibers before applying heat such as fire polishing, or thin film coating with another material. Embodiments of the present disclosure do not require pre-treatment, are capable of bonding crystalline materials to glasses and can form a bond through chemical interaction between materials, forming a solid phase of different composition.

As discussed above, conventional splicing methods result in unsatisfactory insertion loss and/or result in catastrophic failure of the splice due to stress at the interface and large thermo-mechanical differences in the dissimilar materials. Embodiments of the present disclosure provide reaction bonding approaches that address these disadvantages of conventional splicing approaches by creating a stable phase at the interface, which not only minimizes the thermo-mechanical stress but also provides adiabatic guidance of the light propagation across the interface providing gradual variation of index of refraction (i.e., guidance that occurs without a significant transfer of heat to the environment).

In an embodiment, reaction bonding occurs between certain material combinations, such as YAG and silica, and is characterized by the formation of a different material composition (and sometimes a different phase) at a temperature lower than the melting point of a crystalline material and higher than the softening temperature of an amorphous material. In an embodiment, the surface of the crystalline material is stable at temperatures below the melting point, but if the surface is exposed to a distinct but specific material composition, the surface atoms can react and behave differently than the bulk material would. If exposed to enough energy (here it is assumed the energy is delivered as heat), the surface atoms can rearrange and interact with the other material (i.e., react) to form a new, distinct material (e.g., the stable phases). For the case of YAG and silica, a new formed material can be described by a ternary diagram, such as that shown in FIG. 8, which is discussed below. In an embodiment, the interface between the new material and the original ones can continue to react under heat and form multiple distinct regions with different compositions. In certain cases, these distinct regions display a monotonic increase or decrease of material properties which are relevant for high power transmission, such as coefficient of thermal expansion and refractive index.

2. Single Crystal Fibers

A single-crystal fiber (SCF) is a single-crystal with a length typically ranging from 0.01 m to 10 m and a diameter typically ranging from 10 µm to 1 mm. In an embodiment, an ideal range for a SCF is between 1 cm to 50 cm, and an ideal diameter is between 80 µm to 500 µm. There are many different crystals which can be fabricated for SCF optics. Properties of some exemplary oxide crystals used for fabrication of single crystal fiber optics, showing their crystal structure, chemical composition, melting point and index of refraction (reported at 3 µm wavelength) are shown in Table 1 below:

TABLE 1

Properties of Exemplary Oxide Crystals used for SCF Optics

| Material | Symbol | Structure | Melting Point (° C.) | Refractive Index |
|---|---|---|---|---|
| Sapphire | $Al_2O_3$ | Hexagonal - uniaxial | 2040 | 1.709 |
| YAG | $Y_3Al_5O_{12}$ | Garnet - cubic | 1940 | 1.788 |
| GGG | $Gd_3Ga_5O_{12}$ | Garnet - cubic | 2098 | 1.915 |
| Spinel | $MgAl_2O_4$ | Cubic | 2135 | 1.667 |

Single crystal fibers based on the materials mentioned above can provide a passive and active optical fiber medium with a high thermal conductivity, low thermo-optic coefficients (for weak thermal lensing), and a high resistance to mechanical stresses. In an embodiment, single crystal fibers such as, but not limited to, yttrium aluminum garnet (YAG, e.g., $Y_3Al_5O_{12}$), Yttrium Scandium Gallium Garnet (YSGG, e.g., $Y_{2.93}Sc_{1.43}Ga_{3.64}O_{12}$), yttrium lithium fluoride (YLF, e.g., $YLiF_4$), GGG (gadolinium gallium garnet, e.g., $Gd_3Ga_5O_{12}$), and sapphire can be doped with rare-earth ions such as, but not limited to, Yb, Nd3+, Tm3+, Ho, Er3+, etc. These active gain mediums have emission bands from near IR to mid-IR wavelength enabling possibilities to make compact high power laser source from 1 to 5 µm. Single crystal fibers can be cladded with glass and crystal cladding in various different shapes and sizes. In an embodiment, crystal or glass cladding not only improves the beam quality of the laser but also provides a high power cladding pump guidance for laser systems.

SCF materials provide a laser medium, which benefits from the spectroscopic and thermomechanical advantage of bulk crystal over the commonly used silica fiber for high-average power and high-peak power laser operation. High power lasers are understood to be continuous wave or pulsed lasers with average powers ranging from 10 W to 100s of kW. In an embodiment, an ideal average power ranges from 1 kW to 50 kW.

In an embodiment, crystal fibers can be fabricated by using a seed fiber to pull a fiber from molten reservoir held in a crucible or by using a laser heated pedestal growth (LHPG) technique. In an embodiment, LHPG is a crucibleless technique which essentially is a laser growth from the molten zone crystal surface heated by the laser beam. The LHPG method eliminates the possible source of contamination, a crucible itself.

Applications related to high power generation in rare-earth doped crystal fiber can rely on mechanically splicing or free-space coupling of crystal to silica. Splicing these dissimilar fibers can offer a robust (increased reliability), higher throughput (reduced Fresnel loss), and better thermal management (no air interface, higher power handling) than free-space coupling or butt-coupling techniques. For applications beyond the laboratory environment, such as fieldable systems, demonstrations of repeatable splicing with all these benefits are needed. Splicing crystal fiber to silica-based glass fiber is particularly difficult. For example, YAG, being crystal, undergoes a sharp phase change when temperature reaches the melting point (around 1930° C.). With decreasing temperature, a sharp exothermic maximum around 1600° C. has also been observed due to spontaneous solidification at a high degree of supercoiling. To avoid the complexity of the crystal melting and spontaneous solidifying behavior, a crucial step in splicing the crystal and glass is to avoid melting of the crystal at all.

Embodiments of the present disclosure provide systems and methods for chemical bonding (i.e., reaction bonding) splices at elevated temperature around the melting point of a stable intermediate phase between crystal and glass fiber. In an embodiment, the reaction bonding process takes place at a temperature much lower than the melting temperature of one of the materials. In an embodiment, the important parameters for reaction bonding are bonding temperature, bonding duration, and pressure. The reaction bonding process creates an intermediate stable phase (i.e., a buffer zone) at the interface with an index of refraction between crystal and glass. The stable intermediate zone, with an index of refraction and coefficient of thermal expansion between and crystal and glass, not only increases the transmission of light by reducing the Fresnel loss, but also minimizes the thermomechanical stresses between the two fibers significantly during the high power laser operation.

3. Exemplary System for Splicing Fibers with Reaction Bonding

FIG. 1 is a diagram of an exemplary system for splicing a first fiber to a second fiber using reaction bonding in accordance with an embodiment of the present disclosure. In FIG. 1, a first fiber 102 is shown being spliced to a second fiber 104. In FIG. 1, a heating element 106 heats first fiber 102 and second fiber 104 to create a composite spliced fiber of first fiber 102 and second fiber 104.

In an embodiment, first fiber 102 and second fiber 104 are composed of different materials. For example, in an embodiment, first fiber 102 is composed of a crystalline fiber material, and second fiber 104 is composed of an amorphous fiber material. In an embodiment, the materials for first fiber 102 and second fiber 104 have different melting points. For example, in an embodiment, a crystal fiber (e.g., YAG) can have a higher melting point than a glass (e.g., silica) fiber. Further, in an embodiment, some types of fiber materials (e.g., silica, polymer, etc.) can have a transition temperature range (lower than the actual melting point of the material) where the where the fiber material becomes soft. For example, in an embodiment, YAG (a crystal) melts at 1940° C. YAG becomes a liquid at 1940° C. and does not have an intermediate temperature range at which the solid YAG softens before melting into a liquid (i.e., YAG melts from hard solid to liquid at 1940° C. without first softening). For example, the silica silicon dioxide ($SiO_2$) melts at 1710° C. $SiO_2$ becomes soft at approximately 1200° C. $SiO_2$ gradually becomes softer as the temperature increases from 1200° C. until it melts at 1710° C. The temperature range between 1200° C. and 1710° C. is the transition temperature range for $SiO_2$.

In an embodiment, some types of materials have a reaction bonding temperature range (e.g., usually inside the transition temperature range for silicas) wherein the material has become soft enough to react with another material (e.g., the reaction bonding temperature range). In an embodiment, the exact temperature range for the reaction bonding temperature range can vary depending on the types of materials involved. For example, $SiO_2$ can chemically react with YAG between 1350° C. to 1900° C. to form a new material composition representing a mixture of the elements in YAG and $SiO_2$.

In an embodiment, the chemical reaction between two types of fiber materials can slowly change the refractive index between the first material to that of the second material in the intermediate region between the first material and the second material. In an embodiment, this intermediate region can act as a bridge that optically slowly changes the refractive index from one composition to another. For example, in an embodiment, the reaction between the materials in first fiber 102 and second fiber 104 can be understood as the formation of a new material or multiple new materials whose elemental composition is a mixture of the components in first fiber 102 and second fiber 104 with different elemental ratios. For example, for YAG and silica, we observe a continuous change of the elemental composition from crystalline YAG to amorphous silica.

In FIG. 1, the center of heating element 106 is shown by an axis 108. In an embodiment, because first fiber 102 and second fiber 104 have different melting points, first fiber 102 and second fiber 104 are not heated together at the center 108 of heating element 106 (e.g., at the same temperature) because the different melting points of first fiber 102 and second fiber 104 would result in one fiber melting. In an embodiment, the delivery of heat through a filament as described in FIG. 1 can lead to the formation of a large spatial (three-dimensional) heat zone area. Over the large zone, the temperature is not constant, but rather is decreasing with distance from the center of heating element 106. The use of offset 110, moving heating element 106 away from second fiber 104, which has a lower melting temperature, allows the heat to be delivered to first fiber 102, with a higher melting point, and the heat can propagate along first fiber 102, thereby reducing the heat zone to a much smaller volume with the tip of first fiber 102 acting as a source of heat to heat second fiber 104.

For example, in an embodiment, first fiber 102 is composed of crystal, and second fiber 104 is composed of silica. Unlike the case of a silica to silica splice, crystal fiber, such as YAG, expands very rapidly and requires much higher temperature to melt. The problem with the melting point differences can be minimized by offsetting the heat source at the farther offset position towards the crystal fiber side. In an embodiment, the fiber interface under the optimum temperature undergoes a reaction bonding process, enabling the formation of a stable phase. The bonding process during splicing not only provides a robust mechanical splice, but also creates an intermediate stable phase at the interface between first fiber 102 and second fiber 104 with an index of refraction in between crystal and glass, further increasing the transmission by reducing the Fresnel loss.

In an embodiment, first fiber 102 has a higher melting point than second fiber 104. In an embodiment, first fiber 102 is placed at an offset 110 from the center 108 of heating element 106. In FIG. 1, when heating element 106 is turned on and begins to heat first fiber 102, as the right end of first fiber 102 moves further away from the center 108 of heating element 106, the temperature of the right end of first fiber 102 becomes cooler. In an embodiment, the distance of offset 110 (and/or the temperature of heating element 106) is determined such that, when first fiber 102 is moved through the center 108 of (active) heating element 106 to the position of offset 110, the temperature at the right end (e.g., as shown in FIG. 1) of first fiber 102 is within a reaction bonding temperature range at which first fiber 102 and second fiber 104 will chemically react.

For example, in an embodiment, first fiber 102 is composed of YAG, and second fiber 104 is composed of $SiO_2$. In an embodiment, first fiber 102 is moved through the center 108 of heating element 106 to the position of offset 110. In an embodiment, the position of offset 110 is determined such that, when heating element 106 is active, the temperature at the right end of first fiber 102 will be in the range of approximately 1350° C., the temperature range at which YAG and $SiO_2$ chemically react. It should be noted that, in an embodiment, the temperature of heating element 106 is kept high enough so that the right end of first fiber 102 can chemically react with second fiber 104 but low enough so that first fiber 102 does not melt when first fiber 102 is passed through heating element 106. For example, in an embodiment, if first fiber 102 is composed of YAG, the temperature of heating element 106 is kept low enough so that no portion of first fiber 102 is heated to 1940° C., the melting point of YAG.

In an embodiment, second fiber 104 is not positioned to contact first fiber 102 immediately. Rather, in an embodiment, first fiber 102 is moved through the center 108 of heating element 106 to the position of offset 110. Next, second fiber 104 is moved so that the left end of second fiber 104 is a distance (i.e., a second offset) away from the right end of first fiber 102. In an embodiment, this second offset is approximately 10 μm.

In an embodiment, second fiber 104 can be gradually moved closer to first fiber 102 until second fiber 104 contacts first fiber 102. This gradual movement can allow second fiber 104 to gradually warm up to produce a smoother (e.g., less deformed) contact surface with first fiber 102 when second fiber 104 and first fiber 102 are brought into contact. In an embodiment, second fiber 104 is not gradually moved closer to first fiber 102; rather, second fiber 104 expands (due to heat) until second fiber 104 touches first fiber 102, transferring heat. In an embodiment, first fiber 102 expands (due to heat) until first fiber 102 touches second fiber 104. In an embodiment, first fiber 102 and second fiber 104 both expand (due to heat) until first fiber 102 and second fiber 104 come into contact with each other. In an embodiment, once first fiber 102 and second fiber 104 come into contact, additional pressure can be applied to first fiber 102 and second fiber 104 (e.g., via splicers).

In an embodiment, the distance (i.e., the second offset) from first fiber 102 that second fiber 104 is initially positioned at can be determined based on the transition temperature range of second fiber 104. For example, in an embodiment, second fiber 104 is formed from $SiO_2$. In an embodiment, the distance of the second offset is determined such that, when second fiber 104 is positioned at the second offset, the temperature of the left tip (in FIG. 1) of second fiber 104 will fall within the transition temperature range of $SiO_2$ (i.e., between 1200° C. and 1710° C.). This will soften the left tip of second fiber 104. In an embodiment, the softened left tip of second fiber 104 can then be gradually be moved so that it contacts first fiber 102. In an embodiment, the softened left tip of second fiber 104 gradually heats up as it is brought closer to first fiber 102 until, when second fiber 104 contacts first fiber 102, second fiber 104 reaches a temperature within the reaction bonding temperature range of the materials of first fiber 102 and second fiber 104, and second fiber 104 and first fiber 102 chemically react.

In FIG. 1, heating element 106 is a filament heating element. However, it should be understood that other heating elements (e.g., lasers, electrical arcs, etc.) can be used to heat fibers in accordance with embodiments of the present disclosure. In an embodiment, the system of FIG. 1 is used to splice crystal fiber to silica fiber. For example, in an embodiment, first fiber 102 is made of silica, and second fiber 104 is made of crystal (e.g., YAG). However, it should be understood that a variety of materials can be used in accordance with embodiments of the present disclosure. Further, it should be understood that a variety of silicas and crystals can be used in accordance with embodiments of the present disclosure. In an embodiment, the diameters of first fiber 102 and second fiber 104 are in the range of 10 μm to 1 mm. The fiber diameters of first fiber 102 and second fiber 104 need not be identical in accordance with embodiments of the present disclosure.

4. Exemplary Method for Splicing Fibers with Reaction Bonding

Figure 2:
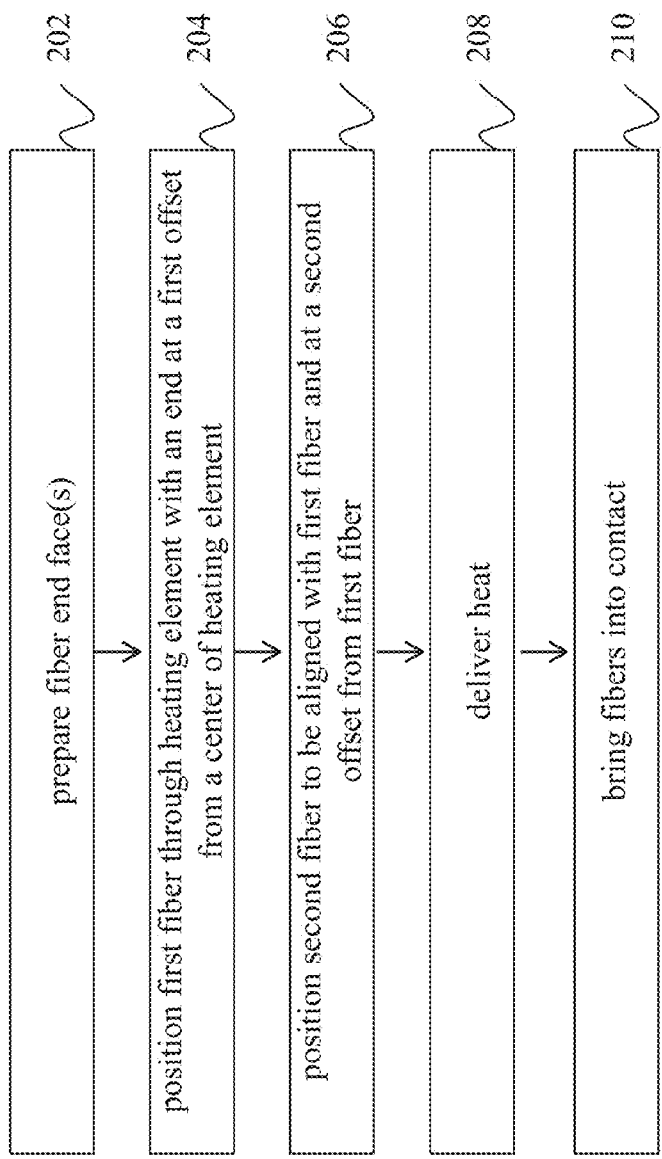
FIG. 2 is a diagram of an exemplary method for splicing a first fiber to a second fiber using reaction bonding in accordance with an embodiment of the present disclosure.

FIG. 2 is a diagram of an exemplary method for splicing a first fiber to a second fiber using reaction bonding in accordance with an embodiment of the present disclosure. In optional step 202, fiber end face(s) are prepared. For example, in an embodiment, first fiber 102 can be a glass fiber (fused silica, doped silica, Ge-doped, phosphate, etc.), and second fiber 104 can be a crystal fiber (Sapphire, YAG, GGG, Spinel, etc.). In an embodiment, the fiber end faces of fiber(s) 102 and/or 104 can be prepared to fuse with each other (e.g., by performing a clean cut at end(s) of fiber(s) 102 and/or 104). The end face preparation can be performed with an optical fiber cleaver, through mechanical polishing, laser processing, etc. In an embodiment, once the fiber end faces are prepared, care should be taken to minimize contamination prior to splicing. In an embodiment, the fiber end faces can be decontaminated (e.g., via cleaning and/or with a short, intense pulse of heat) either before or after cutting the ends of the fibers.

In step 204, a first fiber is positioned through a heating element with an end at a first offset from a center of the heating element. For example, in an embodiment, first fiber 102 can be positioned through the center 106 of the heating area of heating element 106 to the position of offset 110 such that, when heating element 106 is turned on, the temperature at the right end (e.g., as shown in FIG. 1) of first fiber 102 is within a reaction bonding temperature range at which first fiber 102 and second fiber 104 will chemically react.

In step 206, a second fiber is positioned to be aligned with the first fiber and at a second offset from the first fiber. For example, in an embodiment, second fiber 104 can be aligned with first fiber 102 (e.g., in an embodiment, the cylindrical axes of first fiber 102 and second fiber 104 can be aligned such that the optical field propagating in first fiber 102 will be coupled to the optical field propagating in second fiber 104). In an embodiment, second fiber 104 is initially positioned at an offset from first fiber 102 (e.g., in an embodiment, second fiber 104 is positioned approximately 10 μm away from first fiber 102 while still aligned with the cylindrical axis of first fiber 102).

In step 208, heat is delivered. For example, in an embodiment, heating element 106 is activated. It should be noted that heating element 106 can be activated at any other time in this process in accordance with an embodiment of the present disclosure. In optional step 210, the fibers are brought into contact. For example, in an embodiment, once heat is applied to first fiber 102 and second fiber 104, one or both of first fiber 102 and second fiber 104 expand. In an embodiment, this expansion can cause first fiber 102 and second fiber 104 to come into contact. In an embodiment, either or both of first fiber 102 and second fiber 104 can be moved so that they come into contact. In an embodiment a splicer can apply additional contact pressure after the initial contact between first fiber 102 and second fiber 104.

In an embodiment, the contact between first fiber 102 and second fiber 104 induces a reactive bond between first fiber 102 and second fiber 104. In an embodiment, this reactive bond creates an intermediate but stable phase across the spliced interface which not only provides mechanical strength but also provides enhanced wave guiding properties of the light. In an embodiment, the supported light field in the fiber can be defined by the structure of the fiber used, which can include a multitude of configurations such as single mode, multimode, double clad, photonic crystal fiber, etc.

5. Exemplary Spliced Fibers

Figure 3:
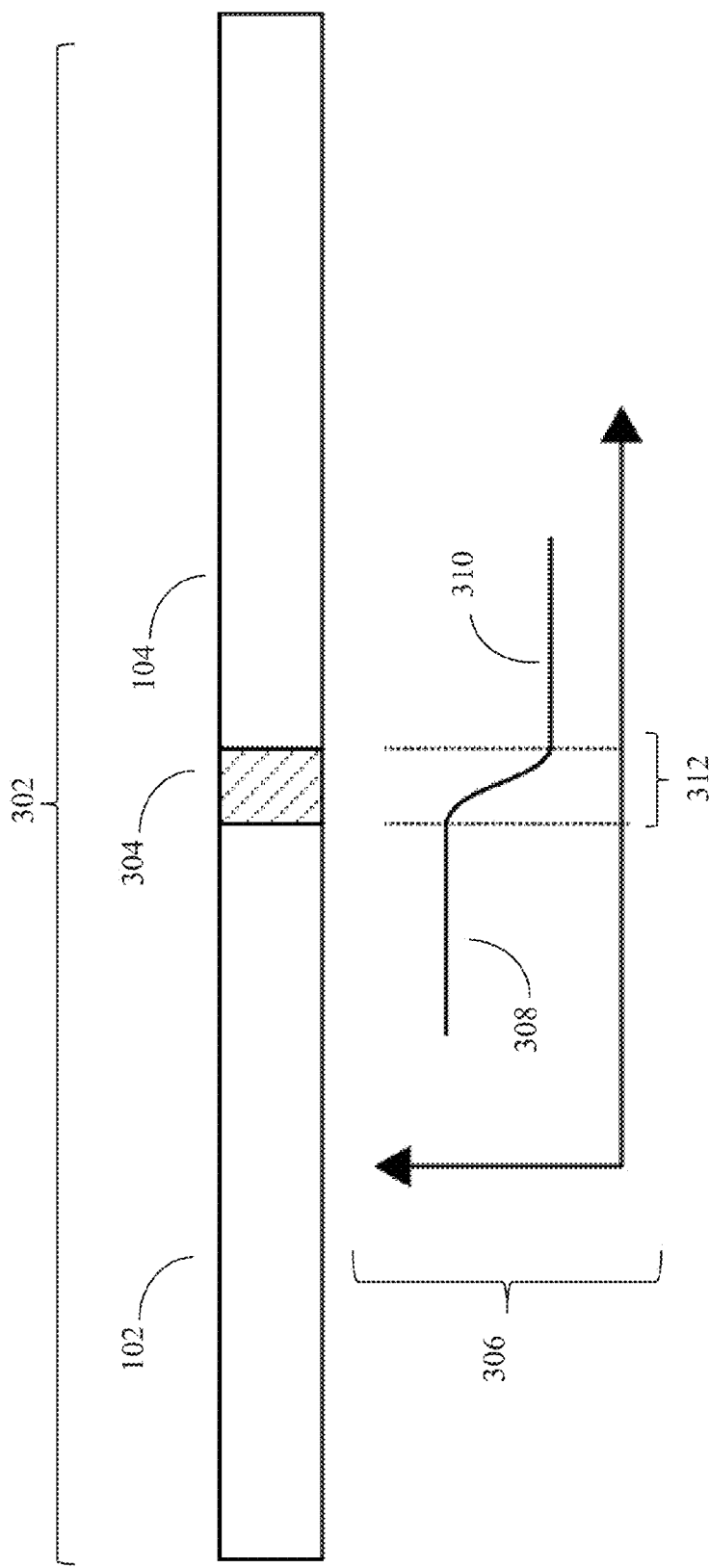
FIG. 3 is a diagram of a spliced fiber in accordance with an embodiment of the present disclosure.

FIG. 3 is a diagram of a spliced fiber in accordance with an embodiment of the present disclosure. FIG. 3 shows a diagram of a resulting spliced fiber 302 after first fiber 102 and second fiber 104 have been spliced together (e.g., using a splicing system with reaction bonding, as described in FIG. 1 and/or a splicing method with reaction bonding, as described in FIG. 2). As shown in FIG. 3, spliced fiber 302 comprises a first portion, formed by fiber 102, a second portion, formed by fiber 104 and an intermediate region 304 between the material of first fiber 102 and second fiber 104 resulting from a reaction between first fiber 102 and second fiber 104. For example, in an embodiment, intermediate region 304 is composed of a new material or multiple new materials whose elemental composition is a mixture of the components in first fiber 102 and second fiber 104 with different elemental ratios. For example, when first fiber 102 is composed of YAG and second fiber 104 is composed of silica, intermediate region 304 includes a continuous change of elemental composition from crystalline YAG to amorphous silica.

In an embodiment, the chemical reaction between the fiber materials of first fiber 102 and second fiber 104 slowly changes the refractive index between that of first fiber 102 and second fiber 104 in intermediate region 304. Graph 306 shown below spliced fiber 302 shows a plot of this change in refractive index along the length of spliced fiber 302. For example, first fiber 102 has a first refractive index 308, and second fiber 104 has a second refractive index 310. In FIG. 3, intermediate region 304 acts as a bridge with a slowly changing refractive index 312, which optically slowly changes the refractive index of spliced fiber 302 from refractive index 308 to refractive index 310.

Embodiments of the present disclosure can also be used to splice two different fibers together using a third fiber spliced between them. For example, in an embodiment, two different crystal fibers (composed of the same crystal material or composed of different crystal materials) can be spliced together using a silica fiber spliced between them in accordance with embodiments of the present disclosure.

Figure 4:
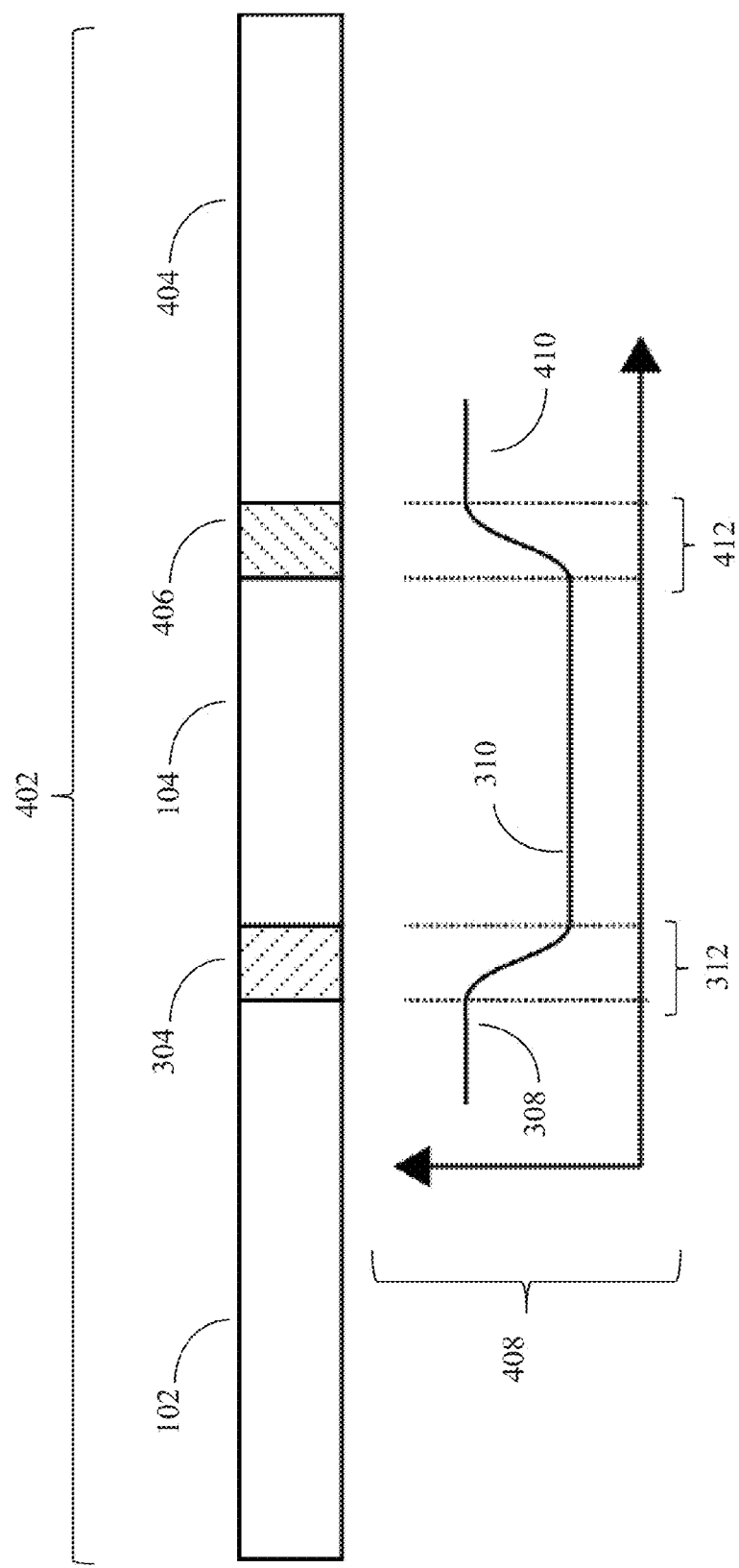
FIG. 4 is a diagram showing a second fiber spliced between a first fiber and a third fiber in accordance with an embodiment of the present disclosure.

FIG. 4 is a diagram showing a second fiber spliced between a first fiber and a third fiber in accordance with an embodiment of the present disclosure. In FIG. 4, spliced fiber 402 is formed when second fiber 104 is spliced between first fiber 102 and a third fiber 404. For example, second fiber 104 can be spliced to third fiber 404 using a splicing system with reaction bonding, as described in FIG. 1 and/or a splicing method with reaction bonding, as described in FIG. 2. In an embodiment, third fiber 404 can be spliced to spliced fiber 302 (e.g., as shown in FIG. 3) after first fiber 102 has been spliced to second fiber 104. In an embodiment, second fiber 104 can be spliced to first fiber 102 and to third fiber 404 substantially simultaneously.

For example, in an embodiment, first fiber 102 and third fiber 404 can both be crystal fibers (e.g., composed of the same crystal material or composed of different crystal materials), and second fiber 104 can be a silica fiber. As shown in FIG. 4, spliced fiber 402 comprises a first portion, formed by fiber 102, a second portion, formed by fiber 104, a third portion, formed by fiber 404, and two intermediate regions 304 and 406.

In an embodiment, the chemical reaction between the fiber materials of first fiber 102 and second fiber 104 slowly changes the refractive index between that of first fiber 102 and second fiber 104 in intermediate region 304, and the chemical reaction between the fiber materials of second fiber 104 and third fiber 404 slowly changes the refractive index between that of second fiber 104 and third fiber 404 in intermediate region 406. Graph 408 shown below spliced fiber 402 shows a plot of this change in refractive index along the length of spliced fiber 402. For example, first fiber 102 has a first refractive index 308, second fiber 104 has a second refractive index 310, and third fiber 404 has third refractive index 410 (which can be the same as or different from refractive index 308). In FIG. 4, intermediate region 304 acts as a bridge with a slowly changing refractive index 312, which optically slowly changes the refractive index of spliced fiber 402 from refractive index 308 to refractive index 310. Intermediate region 406 acts as a bridge with a slowly changing refractive index 412, which optically slowly changes the refractive index of spliced fiber 402 from refractive index 310 to refractive index 410.

6. Exemplary Spliced Fiber Embodiments

Figure 5:
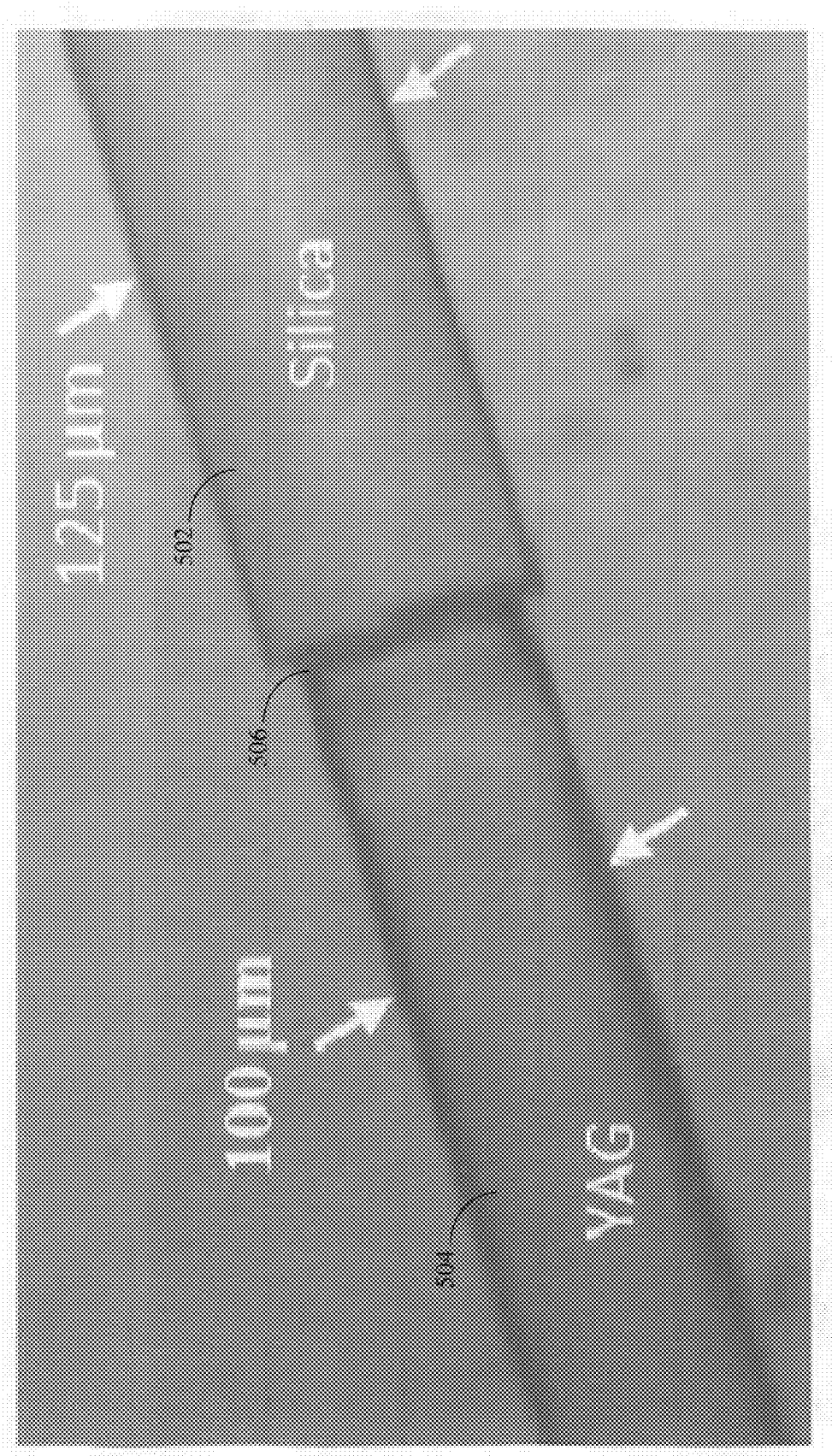
FIG. 5 is a micrograph showing a spliced fiber formed by a splice between a silica fiber and a yttrium aluminum garnet (YAG) fiber in accordance with an embodiment of the present disclosure.

FIG. 5 is a micrograph showing a spliced fiber formed by a splice between a silica fiber and a YAG fiber in accordance with an embodiment of the present disclosure. In FIG. 5, a multimode silica fiber 502 with a 65 μm diameter of Ge-doped core and 125 μm diameter pure-silica cladding is spliced with a 100 μm diameter Yb-doped YAG single crystal fiber 504. A filament-based commercial splicer was used to form a silica-YAG fiber splice. Silica fiber softens around 1200° C., whereas YAG crystal fiber melts around 1940° C. The problem with the melting point differences is minimized by offsetting the heating element at the farther offset position towards YAG side. The fiber interface under the optimum temperature, 500° C. below the melting point of YAG, undergoes reaction bonding process enabling the formation of the stable intermediate region 506.

These spliced fiber of FIG. 5 is mechanically strong and does not require any external support. The splice was characterized for optical transmission and mechanical strength, and the formation of intermediary region 506 was confirmed. The splice loss measured at 1.6 μm wavelength with a continuous wave laser was of around 0.4 dB after taking into account the Fresnel loss in the measurement due to the YAG-Silica interface in intermediate region 506. Fresnel loss was calculated with the index difference between YAG and silica. The splice could withstand more than 400 g of tension before fracturing, which is equivalent to ~50 kpsi of tensile strength for the 100 µm diameter fiber.

In a second exemplary embodiment, a double clad silica fiber with a 10 µm core, 125 µm 151 clad was used to splice with a 100 µm core 151 clad Yb-doped YAG single crystal fiber. A laser based splicer was used. The heat was delivered to a spot offset into the crystalline material, providing a high enough temperature to form an intermediary phase at the interface.

In accordance with embodiments of the present disclosure, the reaction bonding methods for splicing crystal fiber, such as YAG and glass based fiber, such as silica, can be used for many other crystal and glass configurations as well. In an embodiment, the optimum temperature required for the reaction bonding for the various other crystals and glasses can be determined by analyzing a phase diagram or a ternary diagram of the materials in context. One such ternary diagram for silica and YAG is shown in the FIG. 8, discussed in further detail below. In an embodiment, method(s) for splicing these fibers can depend on their thermal properties. Typically, fibers of different compositions can display different thermal expansion coefficients and different melting (e.g., for the case of crystalline materials) and/or softening points (e.g., for the case of amorphous materials).

Figure 6:
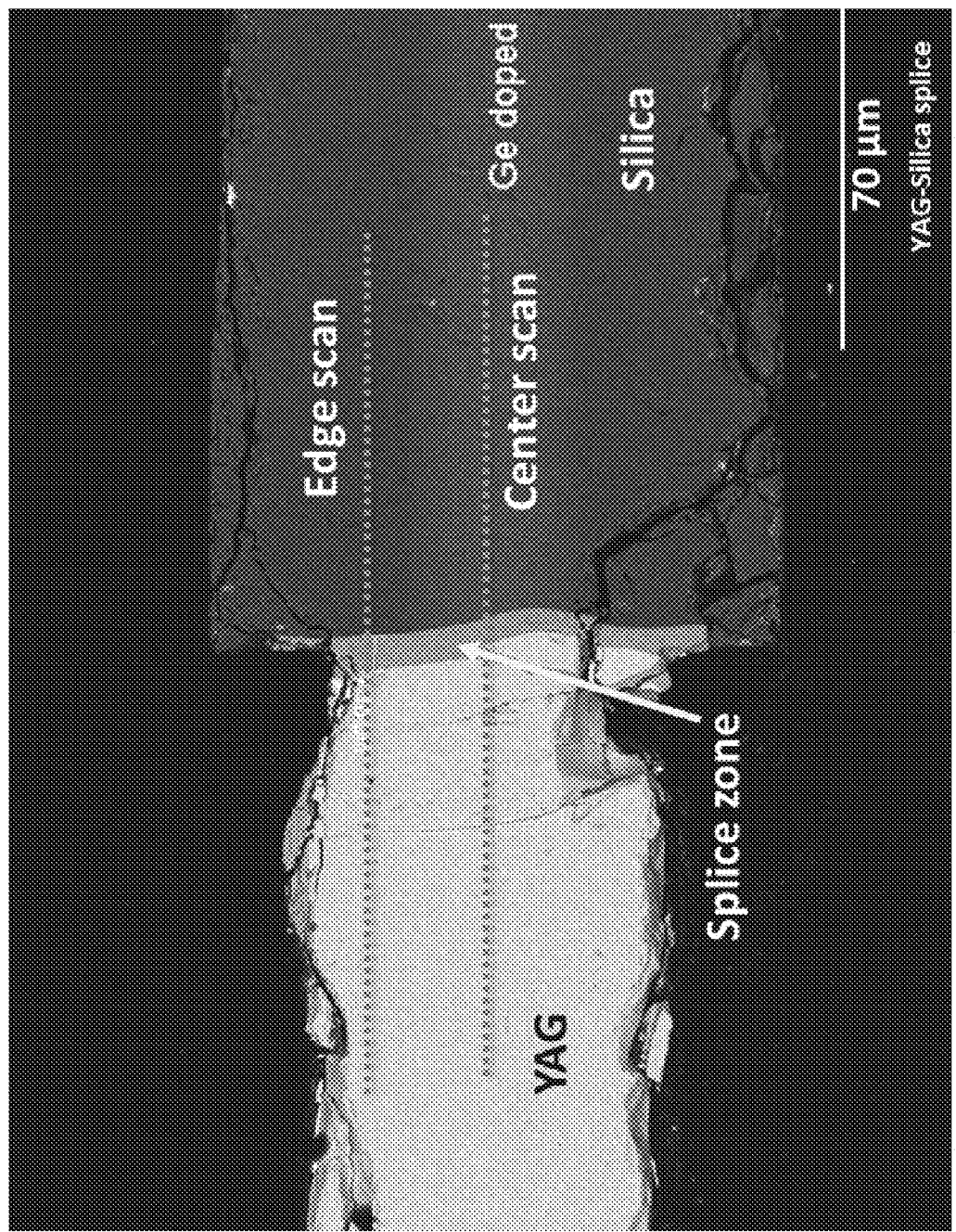
FIG. 6 is a scanning electron microscope (SEM) image of a silica-YAG splice in accordance with an embodiment of the present disclosure.

FIG. 6 is a scanning electron microscope (SEM) image of a silica-YAG splice in accordance with an embodiment of the present disclosure. The silica-YAG splice of FIG. 5 was mounted in epoxy and then ground to the fiber midplane and polished, exposing the material in the center of the fiber at the splice region. Electron probe microanalyzer (EPMA)/wavelength-dispersive X-ray spectroscopy (WDS) line scans were performed through the splice region near the central axis and near the fiber edge.

The formation of the stable phase during reaction bonding has been verified by performing electron probe microanalysis (EPMA). A robust silica-YAG splice was mounted in epoxy and material was ground away and polished exposing the fiber midplane, as shown in FIG. 6. Wavelength dispersive spectroscopic (WDS) line scanning was performed to measure the concentration of known elements: Si, Ge, Y, Al, Yb and O in the vicinity of the splice. Scans were performed in the direction of the fiber axis at the fiber center (within the silica fiber core region). The elemental profile for the scan performed in the "core region" is shown in FIG. 7.

Figure 7:
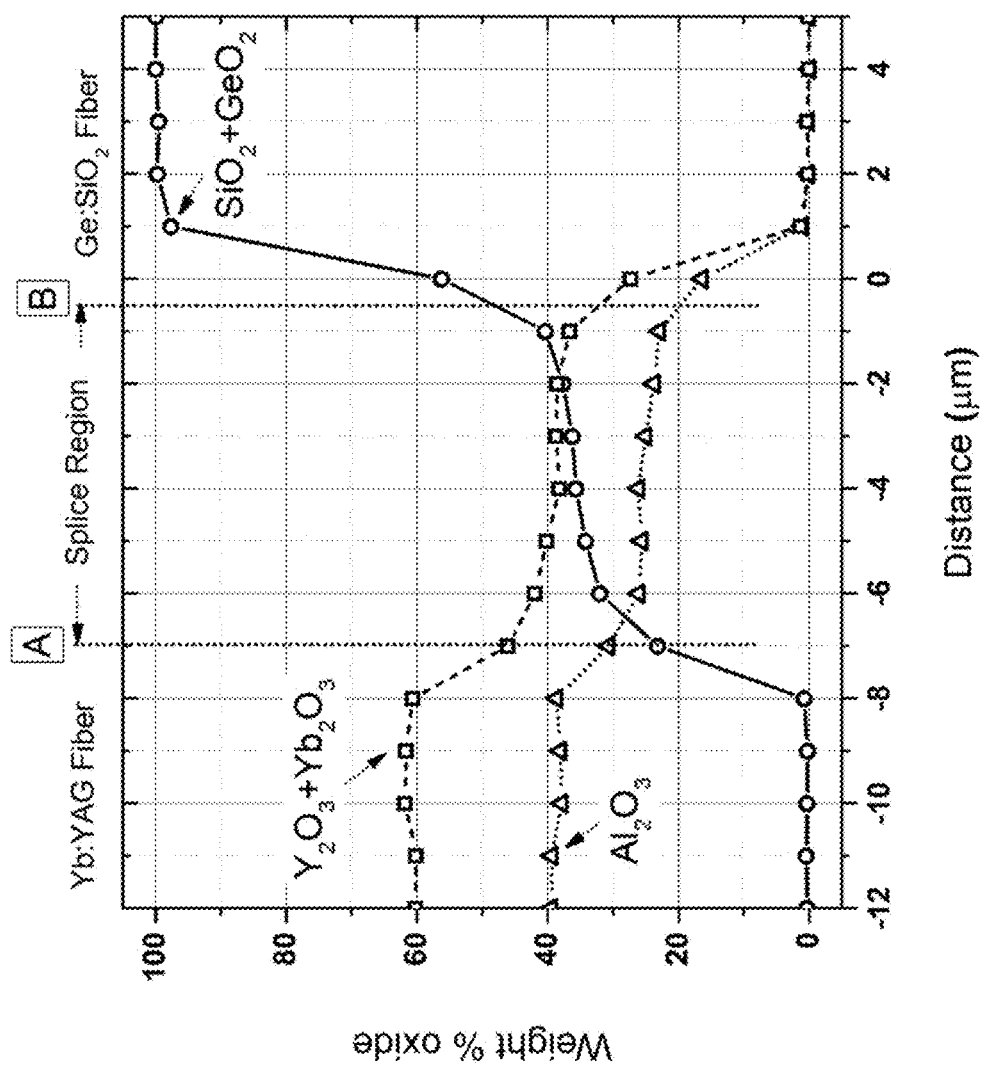
FIG. 7 is a diagram showing electron probe microanalyzer (EPMA) compositional measurements taken in 1 μm increments in the vicinity of a YAG:Silica fiber splice in accordance with an embodiment of the present disclosure.

Specifically, FIG. 7 is a diagram showing EPMA compositional measurements taken in 1 µm increments in the vicinity of a YAG:Silica fiber splice in accordance with an embodiment of the present disclosure. Data was collected at the fiber midplane, coincident with the fibers' common axis. The compositional points within the splice region, delimited by the markers A and B, indicate the formation of an intermediate material within the splice. The elemental profiles for Si, Y, Al, and Yb show concentration gradients over distances of about 9 µm. The profile for germanium, however, varies over a distance of only 2 µm, which is essentially a discontinuity considering the 1 µm spatial resolution of the instrument. This discontinuity in the germanium profile was used as a reference to define the location of the splice interface for all profiles.

The EPMA line scan shows constant concentrations for the silica fiber (points ≥1 µm) and the YAG fiber (points ≤−8 µm) reveals the formation of a stable third phase in between. The composition of this intermediate phase is consistent with a low-melting eutectic yttria-alumino-silicate (YAS). The compositions called out by markers A and B (at −6 and −1 µm, respectively) in FIG. 7 correspond to points A and B in the yttria-alumina-silica phase diagram in FIG. 8, which happen to fall on a eutectic ridge.

Figure 8:
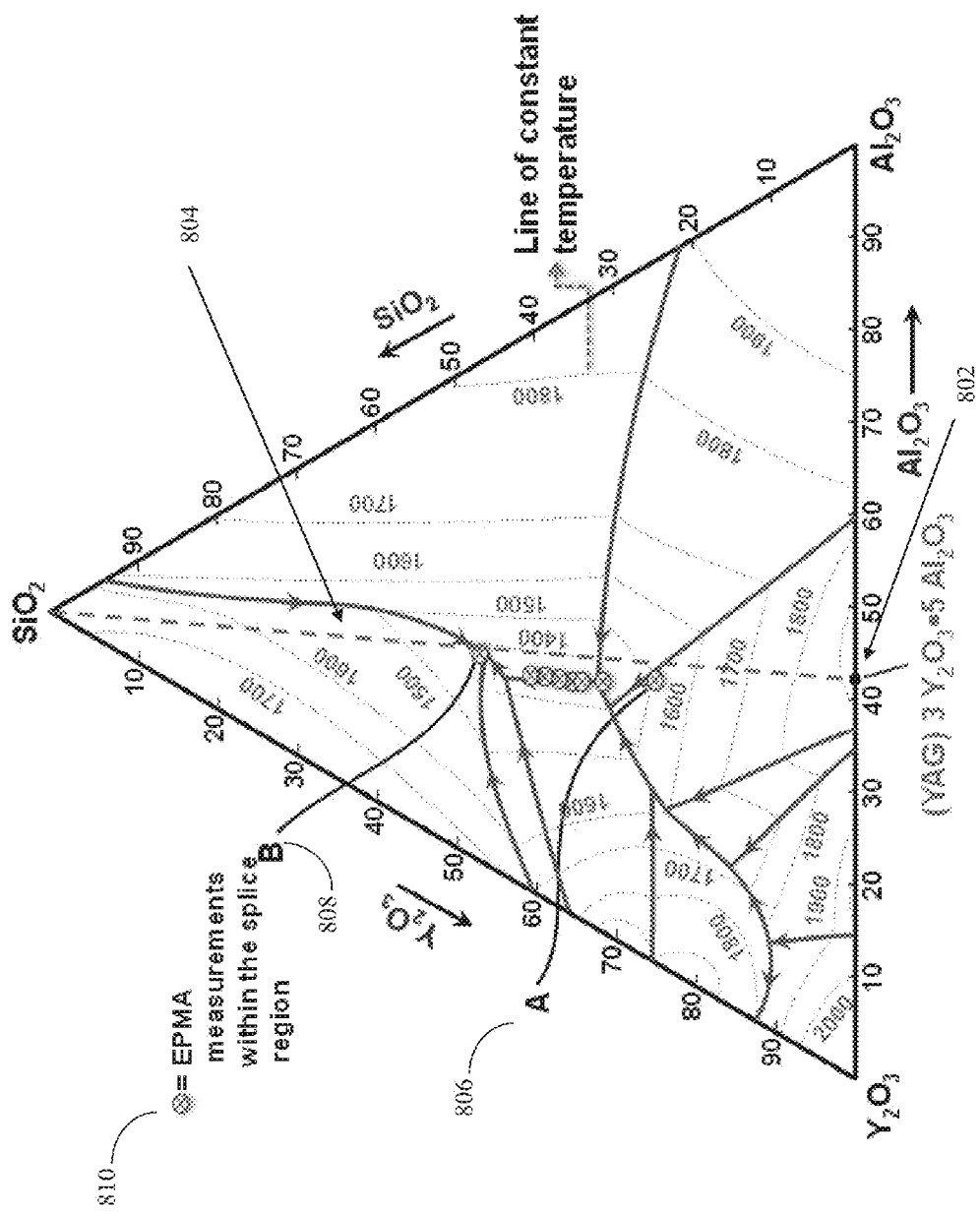
FIG. 8 is a ternary phase diagram of a $Y_2O_3$—$Al_2O_3$—$SiO_2$ diagram in accordance with an embodiment of the present disclosure.

FIG. 8 is a ternary phase diagram of a $Y_2O_3$—$Al_2O_3$—$SiO_2$ diagram in accordance with an embodiment of the present disclosure. In FIG. 8, point 802 marks the YAG composition (in an embodiment, any other ratio of $Y_2O_3$ to $Al_2O_3$ is not considered YAG and represents another crystal). In FIG. 8, dashed line 804 shows the ratio between YAG and silica, and weak dashed lines with numbers under them in FIG. 8 represent constant temperature lines. In FIG. 8, the dark lines with arrows represent compositions that are solid and stable. FIG. 8 shows that, in an embodiment, as you go up in the YAG to Silica path 804, the material would have to react and remain in the "x" marks 810 (where the material is solid), thereby changing its composition. In FIG. 8, the slopes of the profile curves between point A 806 and point B 808 can be attributed to diffusion within the eutectic region during splice formation.

Figure 9:
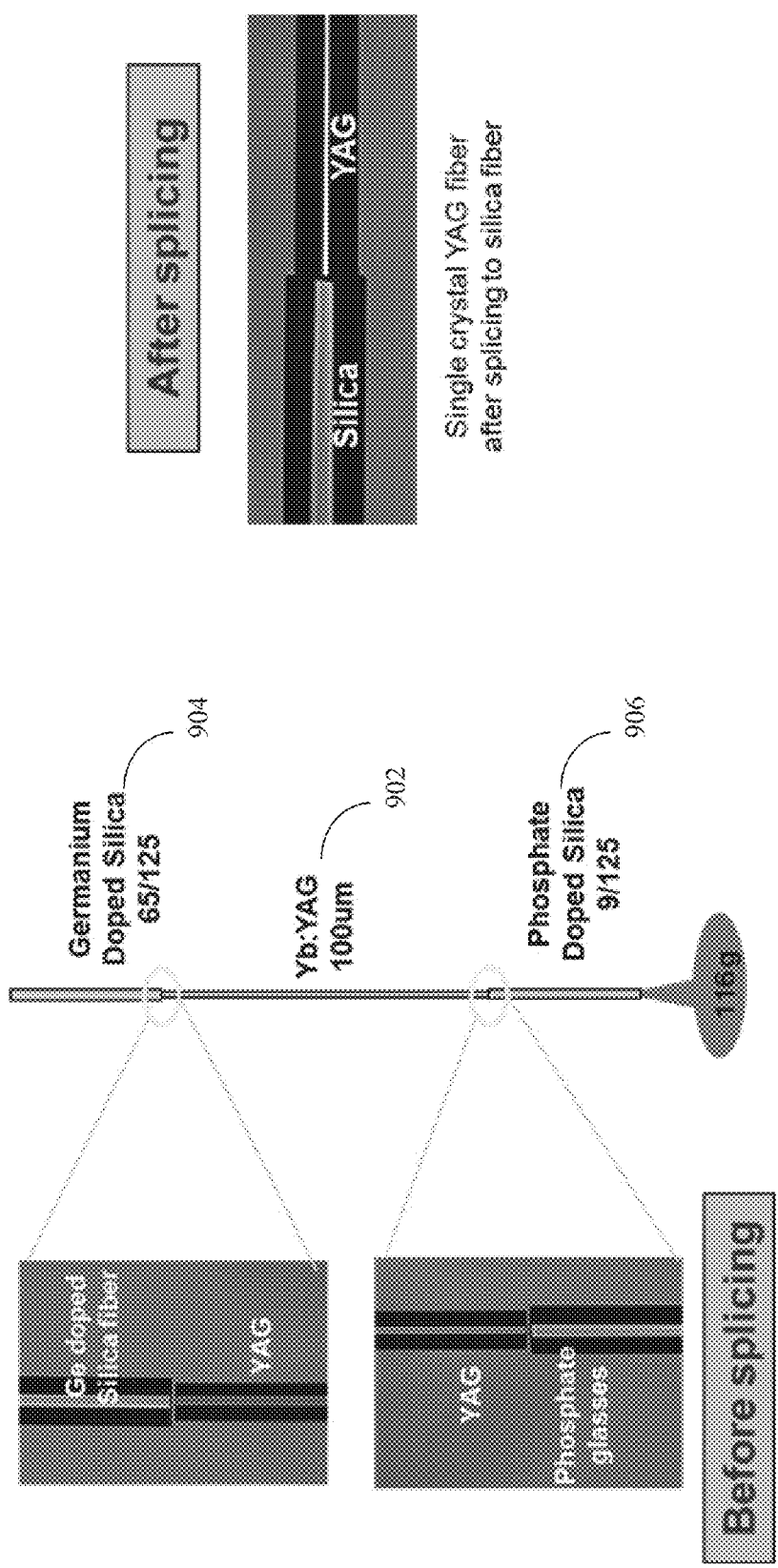
FIG. 9 is a diagram showing a YAG fiber spliced between two different types of silica fibers in accordance with an embodiment of the present disclosure.

FIG. 9 is a diagram showing a YAG fiber 902 spliced between two different types of silica fibers in accordance with an embodiment of the present disclosure. Specifically, in FIG. 9, YAG fiber 902 is spliced between germanium-doped silica fiber 904 and phosphate-doped silica fiber 906. In the spliced fiber of FIG. 9, splice strength of greater than 50 kpsi and a splice loss of 0.33 dB was measured. The loss was measured using 1.65 micron light source.

7. Exemplary Advantages

Spliced fibers in accordance with embodiments of the present disclosure provide several advantages over conventional spliced fibers. For example, embodiments of the present disclosure provide the first spliced fibers between crystal and silica (e.g., glass). A spliced fiber in accordance with an embodiment of the present disclosure does not require an external jacket or any form of support to be mounted. Further, cooling and thermal connections can be made closer to the fibers, which is critical for high power operation.

In an embodiment, chemical bonding intermediate material layer between two spliced fibers provides a stronger bond between the two spliced fibers than bonds that can be achieved using conventional techniques for dissimilar materials and reduces transmission losses. The mechanical strength of a spliced fiber in accordance with an embodiment of the present disclosure is good enough even for the application of a laser system in harsh physical environmental conditions. In an embodiment, the stable intermediate zone of a spliced fiber in accordance with an embodiment of the present disclosure, with index of refraction and coefficient of thermal expansion in between two materials (e.g., crystal and glass), not only increases the transmission of light by reducing the Fresnel loss, but also minimizes the thermo-mechanical stresses between the two fibers significantly during the high power laser operation. For example, in an embodiment, a splice between crystal and glass had a splice strength of greater than 50 kpsi and a splice loss of 0.33 dB.

Embodiments of the present disclosure have direct benefits for the development of high power integrated laser systems based on single crystal fibers in a compact form factor. Single crystal fibers provide a passive and active optical fiber medium with a high thermal conductivity, low thermo-optic coefficients (for weak thermal lensing), and a high resistance to mechanical stresses, which are useful for a high power laser system. Splicing dissimilar fibers offers a robust (e.g., increased reliability), higher throughput (e.g., reduced Fresnel loss), and better thermal management (e.g., no air interface, higher power handling) spliced fiber than spliced fibers using techniques such as free-space coupling or butt-coupling.

8. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A spliced fiber, comprising:
   a first portion, comprising a crystal fiber material;
   a second portion, comprising a second fiber material that is different from the crystal fiber material; and
   an intermediate region coupled between the first portion and the second portion, wherein the intermediate region has an elemental composition different from respective elemental compositions of the crystal fiber material and the second fiber material, wherein the elemental composition of the intermediate region comprises a graded mixture of elements, and wherein elements in the graded mixture transition, along the length of the intermediate region, from elements in the first portion to elements in the second portion.

2. The spliced fiber of claim 1, wherein the second fiber material is a glass fiber material.

3. The spliced fiber of claim 1, wherein the intermediate region comprises a plurality of materials that vary in composition along the length of the intermediate region.

4. The spliced fiber of claim 3, wherein the plurality of materials are stable at temperature that is lower than a melting point of the crystal fiber material.

5. The spliced fiber of claim 1, wherein the crystal fiber material comprises yttrium aluminum garnet (YAG), and wherein the second fiber material comprises a silica fiber material.

6. The spliced fiber of claim 1, wherein the crystal fiber material has a first refractive index, wherein the second fiber material has a second refractive index, and wherein respective refractive indices of the plurality of materials in the intermediate region gradually become farther away from the first refractive index and gradually become closer to the second refractive index along the length of the intermediate region.

7. The spliced fiber of claim 1, further comprising:
   a third portion, comprising a third fiber material; and
   a second intermediate region coupled between the second portion and the third portion.

8. The spliced fiber of claim 7, wherein the crystal fiber material has a first refractive index, wherein the second fiber material has a second refractive index, wherein the third fiber material has a third refractive index, wherein respective refractive indices of a first plurality of materials in the intermediate region gradually become farther away from the first refractive index and gradually become closer to the second refractive index along the length of the intermediate region, and wherein respective refractive indices of a second plurality of materials in the second intermediate region gradually become farther away from the second refractive index and gradually become closer to the third refractive index along the length of the second intermediate region.

9. The spliced fiber of claim 1, wherein the elemental composition of intermediate region is formed based on a reaction between the crystal fiber material and the second fiber material, and wherein a reaction bonding temperature range of the reaction is within a temperature range at which the second fiber material becomes soft.

10. The spliced fiber of claim 1, wherein the crystal fiber comprises a doped with a rare-earth element.

11. The spliced fiber of claim 1, wherein the crystal fiber is undoped.

12. The spliced fiber of claim 1, wherein the second fiber material comprises a doped glass fiber material.

13. A system for creating a spliced fiber, the system comprising:
    a heating element;
    a crystal fiber, positioned through a heating area of the heating element, wherein a first edge of the crystal fiber is positioned at a first offset with respect to a center of the heating element; and
    a second fiber aligned with the crystal fiber, and wherein the second fiber is positioned at a second offset with respect to the first edge of the crystal fiber, wherein the first offset is determined such that, when the heating element is active, a temperature at the first edge radiates sufficient heat to the second fiber such that the crystal fiber and the second fiber chemically react to form an intermediate region between the crystal fiber and the second fiber, wherein the intermediate region comprises a graded mixture of elements, and wherein elements in the graded mixture transition, along the length of the intermediate region, from elements in the crystal fiber to elements in the second fiber.

14. The system of claim 13, wherein the second fiber material comprises a glass fiber material.

15. The system of claim 13, wherein the second offset is determined such that, when the heating element is active, a thermal expansion of the crystal fiber or the second fiber causes the crystal fiber to contact the second fiber.

16. The system of claim 13, wherein the second fiber is configured to be brought into contact with the crystal fiber after a portion of the second fiber reaches a temperature at which the portion of the second fiber becomes soft.

17. The system of claim 13, wherein the crystal fiber comprises yttrium aluminum garnet (YAG), and wherein the second fiber comprises a silica fiber material.

18. A spliced fiber, comprising:
a first portion;
a second portion, comprising a crystal fiber material;
a first intermediate region coupled between the first portion and the second portion, wherein the first intermediate region has an elemental composition different from respective elemental compositions of the first portion and the second portion, wherein the elemental composition of the intermediate region comprises a graded mixture of elements, and wherein elements in the graded mixture transition, along the length of the intermediate region, from elements in the first portion to elements in the second portion;
a third portion; and
a second intermediate region coupled between the second portion and the third portion.

19. The spliced fiber of claim 18, wherein the first portion comprises a glass fiber material, and wherein the third portion comprises the glass fiber material.

20. The spliced fiber of claim 18, wherein the first portion comprises a first glass fiber material having a first elemental composition, and wherein the third portion comprises a second glass fiber material having a second elemental composition that is different from the first elemental composition.

* * * * *